United States Patent [19]

Corso et al.

[11] Patent Number: 4,760,134
[45] Date of Patent: Jul. 26, 1988

[54] PROCESS FOR THE PREPARATION OF THE COPPER COMPLEX DISAZO COMPOUNDS FROM DISAZO COMPOUNDS CONTAINING AN O'-ALKOXYANILINE GROUP BY COPPERING DIMETHYLATION AT A PH AT ABOUT 3–6

[75] Inventors: Anthony J. Corso, Coventry, R.I.; Fritz Meininger, Frankfurt; Hans H. Steuernagel, Kelkheim, both of Fed. Rep. of Germany

[73] Assignee: Hoechst Celanese Corporation, Somerville, N.J.

[21] Appl. No.: 770,341

[22] Filed: Aug. 28, 1985

[51] Int. Cl.$^4$ ............... C09B 45/08; C09B 45/28; C09B 62/515

[52] U.S. Cl. ............... 534/629; 534/583; 534/602; 534/684; 534/719

[58] Field of Search ............... 534/602, 629, 684, 719

[56] References Cited

U.S. PATENT DOCUMENTS

| | | | |
|---|---|---|---|
| 3,135,730 | 6/1964 | Heyna et al. | 534/629 |
| 3,406,160 | 10/1968 | Wicki | 534/684 |
| 3,457,252 | 7/1969 | Meininger | 534/629 |
| 4,215,042 | 7/1980 | Buhler et al. | 534/629 X |
| 4,424,152 | 1/1984 | Mennicke et al. | 534/684 |

OTHER PUBLICATIONS

Venkataraman, "The Chemistry of Synthetic Dyes", vol. III, Academic Press, New York, pp. 339 to 342 (1970).

Primary Examiner—Floyd D. Higel
Attorney, Agent, or Firm—Hugh C. Crall

[57] ABSTRACT

This invention is that of an improved process for preparing 1:1 copper complex disazo compounds which comprises treating a disazo compound of the following general formula (2):

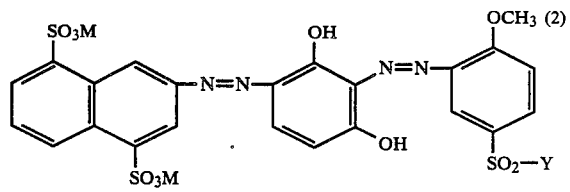

wherein:
M is hydrogen or the equivalent monovalent or divalent metal and
Y is the vinyl group or $CH_2-CH_2-Z$ wherein Z is a radical that can be eliminated by an alkaline agent
with a copper donor at a temperature from about 70° to about 130° C. and at a pH from about 3 to about 6. The compounds of the process of the invention are used as dyestuffs.

5 Claims, No Drawings

PROCESS FOR THE PREPARATION OF THE COPPER COMPLEX DISAZO COMPOUNDS FROM DISAZO COMPOUNDS CONTAINING AN O'-ALKOXYANILINE GROUP BY COPPERING DIMETHYLATION AT A PH AT ABOUT 3-6

BACKGROUND OF THE INVENTION

The present invention is directed to the preparation of copper complex disazo dyestuffs. It is an improved process for the preparation of the dyestuff set forth below.

The 1:1 copper complex disazo dyestuff of the metal-free disazo compound of the formula (written in the form of the free acid):

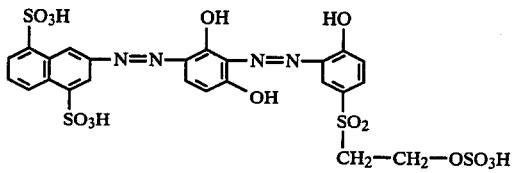

is known and its preparation is disclosed in Example 12 of U.S. Pat. No. 3,364,194. It comprises a two-step coupling reaction followed by copperization wherein 2-naphthylamine-4,8-disulfonic acid, after diazotization in aqueous acid solution is coupled with resorcinol to give a monoazo compound. The monoazo compound is salted out, isolated by filtration, and then added, in the form of the moist filter cake, to a neutral, aqueous solution of the diazonium salt of 2-amino-4-(beta-sulfatoethylsulfonyl)phenol. The second coupling reaction is carried out at a pH between 6.5 and 7.5. Copper sulfate is added to the resulting metal-free disazo dyestuff and the latter is converted into its copper complex compound at a pH between 5 and 6.

The 2-amino-4-(beta-sulfatoethylsulfonyl)-phenol starting material for the second diazo component of Example 12 is prepared by esterifying 2-amino-4-(beta-hydroxyethylsulfonyl)-phenol in an excess of concentrated sulfuric acid and subsequently diazotizing the product in an aqueous medium. The pH of the diazonium salt solution is then adjusted to a value between 6.5 and 6.8 with sodium bicarbonate.

A similar preparation method is disclosed in Example 17 of U.S. Pat. No. 4,334,076 by starting from 2-amino-4-(beta-sulfatoethylsulfonyl-phenol with nearly equivalent amounts of a sulfating agent, such as concentrated sulfuric acid or sulfuric acid containing sulfur trioxide, in a machine operating with a kneading action.

These prior art processes have several disadvantages:

(1) The monazo compound of the formula (Written in the form of the free acid)

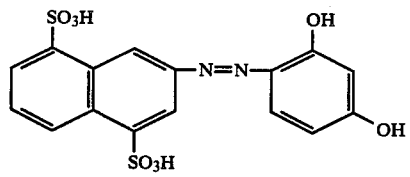

couples with the diazonium compound of 2-amino-4-(beta-sulfatoethylsulfonyl)-phenol only very slowly. The second coupling reaction requires a reaction time of about 24 hours;

(2) The synthesis of 2-amino-4-(beta-sulfatoethylsulfonyl)-phenol is somewhat difficult in that it requires several reaction steps involving a high investment for equipment. In its preparation, it is necessary to start from 2-nitro-4-(beta-hydroxyethylsulfonyl)-anisole which is dealkylated by heating with aqueous sodium hydroxide solution to give 2-nitro-4-(beta-hydroxyethylsulfonyl)-phenol. The resulting phenol is then reduced to give 2-amino-4-(beta-hydroxyethyl-sulfonyl)-phenol which, in turn, must be sulfated in accordance with the disclosure of U.S. Pat. Nos. 3,364,194 or 4,334,076.

U.S. Pat. No. 3,457,251 discloses the preparation of copper, cobalt and chromium complex disazo dyestuffs. Ring substituents capable of forming metal complexes are disclosed to be first the hydroxyl group, further the carboxyl group and the alkoxyl groups. According to Example 1 of this patent the monoazo reaction product of 3-amino-5-hydroxynaphthalene-7-sulfonic acid and 1-amino-8-hydroxynaphthalene-2,4 disulfonic acid is coupled with 2-amino-1-methoxybenzene-4-beta-hydroxyethyl sulfone - sulfuric acid ester and the resulting disazo dyestuff copperized by demethylating the methoxy benzene by the addition of copper sulfate (1.73 molar amount) and reacting for 15 hours at the boil. No examples of disazo dyestuffs of resorcinol are disclosed.

SUMMARY OF THE INVENTION

According to the present invention it has been found that 1:1 copper complex disazo compounds of metal-free disazo compounds of the general formula (1)

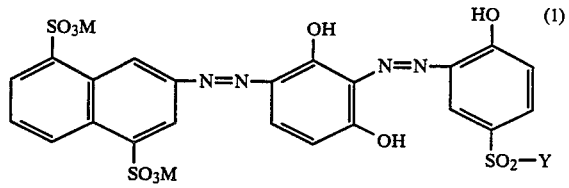

in which the copper atom is attached in the form of a complex to one of the two hydroxy groups of the resorcinol component and to the hydroxy group of the diazo component can be prepared under substantially easier, less expensive conditions with fewer reaction steps if the starting material used is a metal-free disazo compound of the following general formula (2).

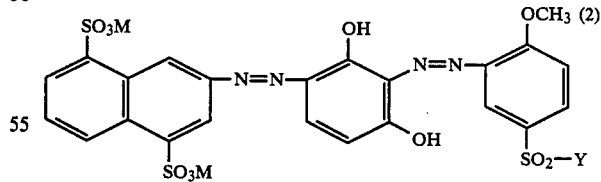

This compound (general compound {2}) is treated by reacting it with a copper donor at a temperature between 70° and 130° C. and a pH between 3 and 6.

In the above and following formulas, M denotes a hydrogen atom or the equivalent of a monovalent or divalent metal, in particular an alkali metal or alkaline earth metal e.g. sodium, potassium, lithium or calcium, preferably sodium or lithium. Y represents the vinyl group or an ethyl group containing, in the beta position, a radical, Z which can be eliminated in the form of an anion by means of an alkali; Z is preferably the sulfato group.

The process of the invention has particular merit and advantage because the disazo compound of the general formula (2) can be obtained in a simple, rapid and economical manner by coupling the monoazo compound of the following general formula (3)

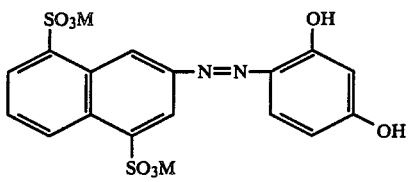 (3)

with the diazonium compound of an amine of the following general formula (4)

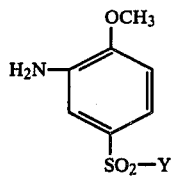 (4)

The advantages of the process of the invention are first, 2-amino-methoxybenzene compound of the general formula (4) is considerably more easily obtained than 2-amino-4-(beta-sulfatoethylsulfonyl)-phenol (the diazo component of the prior art). Secondly, in comparision with the aminophenol compound of the prior art, the diazonium compound of the amine of the general formula (4) has, in addition, the advantage that it couples with the compound of the general formula (3) very rapidly and is complete after about one hour. Also, the conversion of the metal-free disazo compound of the general formula (2) into its 1:1 copper complex disazo compound is also more rapidly effected.

DESCRIPTION OF THE PREFERRED EMBODIMENTS

This invention is an improved process for preparing the copper complex disazo represented by the following general formula 1 (written as the free acid):

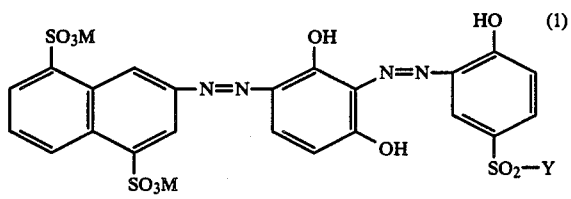 (1)

In the above formula the copper atom is attached in the form of a complex to one of the hydroxy groups of the central resorcinol component and to the hydroxy group of the right hand diazo component, the groups M and Y being as previously defined.

The process comprises treating a disazo compound of the following general formula (2):

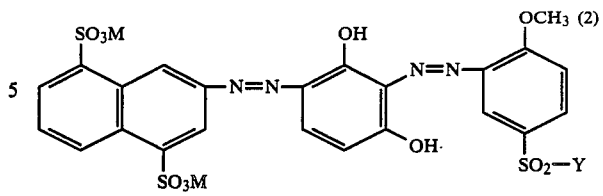 (2)

with a copper donor at a temperature from about 70° to about 130° C. and at a pH of about 3 to about 6.

The disazo compound of the general formula (2) is prepared by coupling the monoazo compound of the following general formula (3):

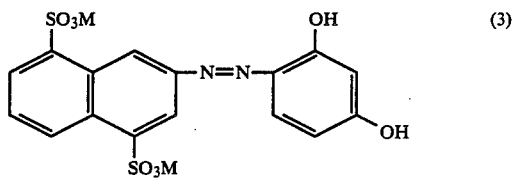 (3)

with a diazonium compound of an amine of the following general formula (4):

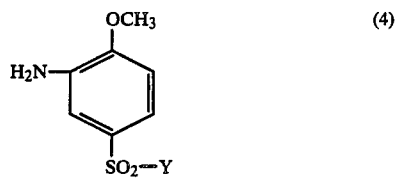 (4)

The amine of the general formula (4) can be easily prepared by a two step reaction starting from 2-nitro-4-(beta-hydroxyethylsulfonyl)-methoxybenzene. This nitro compound is first reduced and then sulfonated to give the 2-amino-4-(beta-sulfatoethylsulfonyl)-methoxybenzene. It is not necessary to use a large excess of sulfonating agent in the esterification step and the amine of the general formula (4) can be used directly without purification. It is diazotized and coupled with the monoazo component represented by the general formula (3) to produce a relatively pure aqueous solution of the disazo compound represented by general formula (2).

Secondly in comparision with coupling of the aminophenol of the prior art, this coupling proceeds rapidly; being completed in about one hour. The disazo compound (general formula {2}) is converted to the 1:1 copper complex by a dealkylating copperizing reaction. This reaction also proceeds more rapidly than expected. It does not require an excess of copper donor which consequently produces a cleaner reaction mixture which can be used directly as a dyestuff solution after filtration.

Copper donors suitable in this process are inorganic and organic copper compounds, preferably copper salts, such as copper sulfate, copper acetate, copper chloride and basic copper carbonate. The dealkylating copperizing reaction according to the invention can be carried out using equimolar amounts of the copper compound, relative to the starting disazo compound of the general formula (2). However, an excess of the copper donor causes the reaction time to be shortened. When the copperizing reaction is complete, excess copper can be precipitated, for example as the oxalate by adding oxalic acid, which can be removed from the reaction medium by filtration. The copper oxalate can be worked up and reused.

The reaction according to the invention is preferably carried out in an aqueous medium. Small amounts of an organic, water-miscible solvent which is inert in the reaction for example, a low molecular alcohol, can be present.

If the reaction is carried out above 100° C. It in closed equipment under pressure. However, it is preferred to carry out the reaction at a temperature between 80° and 100° C. It is also preferable to carry out the reaction in a pH range between 3.5 and 5.0. The pH is maintained by adding appropriate buffering substances, such as an alkali metal acetate, preferably sodium acetate and especially lithium acetate.

It is advantageous to obtain the dyestuffs of the general formula (1) by the process of the invention in the form of lithium salts and, correspondingly, to use as starting materials compounds which are already wholly or partially in the form of lithium salts. The lithium salts of the copper complex end product ensure particularly good water solubility, a factor which is reflected advantageously when they are employed in padding liquors and printing pastes or highly concentrated aqueous dyeing compositions.

Thus, the compound of the general formula (b 3) can be prepared in an advantageous manner by first diazotizing 2-naphthyl-amine-4,8-disulfonic acid in a customary manner, coupling the product in an acid pH range with resorcinol (1,3-dihydroxybenzene) and then adjusting the pH of the acid solution with a basic lithium salt, such as lithium acetate, to a range between about 3 and 6, within which pH range the second coupling reaction with the diazo component of the formula (4) is carried out. The neutralization of the acid from the second diazotization the coupling reaction and the maintenance of the pH range during the coppering reaction can also be carried out using an alkaline lithium compound, in particular, lithium acetate.

The process according to the invention of reacting the diazo components of the general formula (4) with the couplable monoazo compound of the general formula (3) is preferably carried out in an aqueous medium. The diazotization of the amine of the general formula (4) is effected in a customary manner, preferably by means of sodium nitrite in an acid aqueous solution. The coupling reaction can be carried out at a temperature between 0° and 25° C. and at a pH between 2.5 and 7, preferably between 3 and 5.

In the general formula of this description M denotes a hydrogen atom or the equivalent of a monovalent or divalent metal, in particular an alkali metal or alkaline earth metal e.g. sodium, potassium, lithium or calcium, preferable sodium or lithium. Y represents the vinyl group or an ethyl group containing, in the beta-position, a radical Z which can be eliminated in the form or an anion by means of alkaline substance. The radical Z is preferably the sulfato group.

Examples of radical Z, attached to the beta position of the ethyl group, which can be eliminated under alkaline conditions as an anion to form a vinyl group, are the acid radicals of inorganic and organic acids, such as sulfuric acid, phosphoric acid or hydrochloric acid, or of alkanecarboxylic acids, alkanesulfonic acids, aromatic carboxylic acids and aromatic sulfonic acids. The chlorine atom, the thiosulfato group, the phosphato group, the acetoxy group and especially the sulfato group may be mentioned as preferred radicals which can be eliminated to form the vinyl group. Accordingly, it is preferable that Y is the beta-thiosulfatoethyl group ($-CH_2-CH_2-S-SO_3M$), the beta-phosphatoethyl group ($-CH_2-CH_2-OPO_3M_2$), the beta-chloroethyl group, the beta-acetoxyethyl group, the vinyl group and particularly preferably the beta-sulfatoethyl group ($-CH_2-CH-OSO_3M-$).

The 1:1 copper complex disazo compounds are prepared in accordance with the 1 invention in a very high yield and purity. They can be used as dyestuffs for tinctorial use, from the reaction solution after the latter has been filtered, either without further treatment in a dissolved form or if desired after evaporating or spray-drying the reaction solution. In either case, no effluent is produced in the process for preparing the 1:1 copper complex disazo compounds in accordance with the invention. It is also unnecessary to salt out the copper complex disazo compounds prepared according to the invention because these copper complex compounds are obtained in a sufficiently high purity in the reaction solution or when the latter is evaporated.

The copper complex disazo dyestuffs prepared according to the invention possess very good solubility in water. They have fiber-reactive properties and constitute valuable dyestuffs. They are suitable for dyeing and/or printing materials, in particular fiberous materials, composed of natural or regenerated cellulose, such as cotton, linen, hemp, jute and viscose rayon, or of natural, regenerated or synthetic polyamides, such as silk, wool, nylon 6, nylon 6-6, nylon 11, and also fiber materials composed of synthetic polyurethane and leather. They are particularly suitable as fiber-reactive dyestuffs for dyeing or printing cellulose or fiberous materials containing cellulose.

Thus, the copper complex disazo compounds of the invention give cellulose fibers dyeings having a high depth of color and high dyestuff yield, for example when they are used in the exhaustion process from a long liquor containing acid-binding agents and optionally neutral salts, such as sodium chloride or sodium sulfate. Deep dyeings and prints are also obtained on cellulose fiber materials by the padding process and by the customary printing processes. In general, the processes which are customary in the art for fiber-reactive dyestuffs can be used for applying and fixing the copper complex disazo compounds prepared in accordance with the invention, with agents having an alkaline reaction, for example, alkali metal hydroxides, carbonates, bicarbonates, phosphates or silicates wherein the aklali metal is preferably sodium or potassium.

The dyeings and prints which can be obtained on the said materials using the copper complex disazo compounds prepared by the invention possess a reddish-tinged brown color shade and are of distinguished high tinctorial strength. They exhibit very good fastness to light and good to very good fastness properties to wet processing, in particular, good to very good fastness to water, washing and prespiration.

The examples which follow serve to illustrate the invention. The parts mentioned therein are parts by weight, and the percentages are percentages by weight, unless otherwise noted. The relationship between parts by weight and parts by volume is that of kilograms to liters.

EXAMPLE 1

(a) 303 parts of 2-aminonaphthalene-4,8-disulfonic acid in a mixture of 2,000 parts of water, 500 parts of ice and 200 parts of 30% aqueous hydrochloric acid are diazotized at 0° to 10° C. with an aqueous solution containing 70 parts of sodium nitrite. Excess nitrite is then destroyed by means of sulfamic acid. 110 parts of 1,3-dihydroxybenzene (resorcinol) are then added and stirring is continued until the coupling is complete. The pH of the batch is then adjusted to a value between 6 and 7 with 33% aqueous sodium hydroxide solution.

(b) 311 parts of 2-amino-4-(beta-sulfatoethylsulfonyl)-anisole in 1,000 parts of water, 500 parts of ice and 200 parts of 33% aqueous hydrochloric acid are diazotized at a temperature between 0° and 5° C. with an aqueous solution containing 70 parts of sodium nitrite. Excess nitrite is then destroyed. The solution of this diazonium salt is then added with stirring to the monoazo compound prepared under part (a) of this example. The pH is adjusted to a value between 4 and 5.5 by slowly adding sodium carbonate. The coupling is complete after one hour and the reaction solution contains the disazo compound of the formula

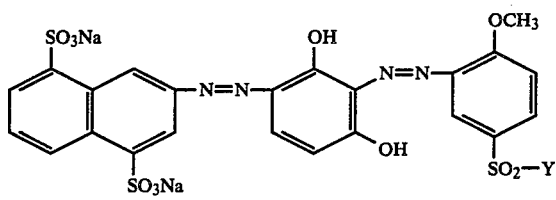

wherein Y is the beta sulfatoethyl group (c) 250 parts of copper sulfate pentahydrate are added to the solution of the disazo compound obtained under part (b) of this example. The pH is kept within the range of 4.0 to 5.0 by the addition of sodium acetate. The reaction batch is heated to 90° C. and is stirred for about another 6 hours at a temperature between 90° and 95° C., until metal-free starting disazo compound can no longer be detected by chromatography. The pH of the reaction batch is adjusted to a value between 5 and 5.5 by means of sodium carbonate, kieselguhr is added and the mixture is filtered.

The 1:1 copper complex disazo compound solution obtained under part (c) can be used without further treatment for dyeing or printing fiberous materials, in particular, cellulose fibers, e.g. cotton, by known dyeing methods for fiber-reactive dyestuffs. If desired, the dyestuff solution can previously be concentrated by customary methods e.g. evaporation.

The 1:1 copper complex disazo compound obtained by the invention can also be isolated in the form of a solid by evaporating the dyestuff solution to dryness or by spray drying. The dry dyestuff can, if required, be ground to the desired particle size.

About 1,500 parts of a brown powder are obtained, which contains about 57% of the sodium salt of the 1:1 copper comlex disazo, compound wherein Y is the beta-sulfatoethylsulfonyl group, sodium chloride and sodium sulfate salts. When used for dyeing and printing by the standard methods for fiber-reactive dyestuffs, this dyestuff affords, e.g. on cotton, deep reddish-tinged brown dyeings and prints of excellent fastness to light and good to very good fastness properties to wet processing, for example, good to very good fastness to water, washing and perspiration.

(d) The 2-amino-4-(beta-sulfatoethylsulfonyl)-anisole used as the diazo component under (b) of this example can be prepared as follows: 231 parts of 2-amino-4-(beta-hydroxyethylsulfonyl)-anisole are introduced into 164 parts of 60% aqueous sulfuric acid. The mixture is stirred for 2 to 3 hours at 80° C. until homogeneous and then heated on an enamelled sheet of metal for about 20 hours at 130° to 140° C., preferably under reduced pressure, until esterification is complete (this can be checked in a customary manner by thin layer chromatography or by high pressure liquid chromatography). This gives about 315 parts of residue composed almost entirely of the desired 2-amino-4-(beta-sulfatoethylsulfonyl)-anisole.

EXAMPLE 2

400 parts of copper sulfate pentahydrate are added to the solution of metal-free disazo compound prepared in accordance with Example 1(b), and the pH is adjusted to a value between 4 and 4.5 with sodium acetate. The batch is heated to the boil and refluxed. The copperizing reaction is complete after about 3 hours; metal free starting disazo compound can no longer be detected. The reaction is allowed to cool, 78 parts of oxalic acid dihydrate are added, and the pH is adjusted to a value between 5 and 6 with sodium carbonate, 50 parts of kieselguhr are added and stirring is continued for 2 hours. The batch is then filtered. The filtrate contains the sodium salt of the 1:1 copper complex disazo compound of the metal-free disazo compound corresponding to the general formula (1) in which Y is the beta-sulfatoethylsulfonyl group.

EXAMPLE 3

250 parts of copper sulfate pentahydrate and 320 parts of crystalline sodium acetate are added to the solution of metal-free disazo compound prepared in accordance with Example 1b). The reaction mixture is heated in a pressure vessel to 120° C., and held for about 2.5 hours under pressure at this temperature. The copperizing reaction is then complete.

The reaction mixture is worked up in accordance with the procedure described in Example 1(c). The copper complex disazo dyestuff obtained in this example and also that of Example 2 have the same good properties as the dyestuff obtained in accordance with Example 1(c).

EXAMPLE 4

The procedure of Example 2 is followed, but the copperizing reaction is not carried out under reflux, but with stirring at a temperature between 80° and 85° C. The copperizing reaction is complete after about 13 hours. A dyestuff of the same good quality as that described in the previous examples is obtained.

EXAMPLE 5

The procedure of Example 2 is followed, but the pH is maintained at a value between 3.5 and 4.0 during the copperizing reaction. The reaction is complete after about 3 hours. A copper complex disazo dyestuff of the same good tinctorial properties as the dyestuff of the previous examples is obtained.

EXAMPLE 6

The procedure of Example 2 is followed, but the copperizing reaction is carried at a pH between 5.0 and 5.5. The reaction is complete after about 8 hours. A copper complex disazo dyestuff having the same good tinctorial properties as those of the previous examples is obtained.

EXAMPLE 7

(a) 30.3 parts of 2-aminonaphthalene-4,8-disulfonic acid are stirred into about 700 parts of water at 0° to 5° 1 C., and 50 parts of 31% strength aqueous hydrochloric acid are added. Diazotization is then carried out below 5° C. by adding 18 parts of 40% aqueous sodium nitrite solution. The mixture is stirred for another hour and excess nitrous acid is then destroyed in a usual manner. 11.3 parts of resorcinol are then added to this diazonium salt solution, and the coupling reaction is completed with further stirring, until no more than 2% of the coupling component can be detected. The pH is then adjusted to a value between 3.0 and 4.0 with of about 50 parts of lithium acetate.

(b) In a separate reaction, 32.66 parts of 2-amino-4-(beta-sulfatoethylsulfonyl)-anisole are stirred into about 200 parts of water at 0° C., and 20 parts of 31% aqueous hydrochloric acid are added. Diazotization is carried out with 18 parts of 40% aqueous sodium nitrite solution; the diazotization is then continued for another hour at below 5° C., and excess nitrous acid is the destroyed.

(c) The solution of monoazo compound prepared under part (a) is added to the diazonium salt solution prepared under part (b), the pH is adjusted and maintained at a value between 4 and 4.5, during the coupling reaction, by the addition of sodium carbonate. When the coupling is complete, 25 parts of copper sulfate pentahydrate are added, the mixture is heated to 90° C. and the pH is maintained at a value between 4 and 4.5 using about 50 parts of lithium acetate. The copperizing reaction is completed in about 8 to 10 hours at a pH within the range from 4 to 4.5 and at a temperature between 85° and 90° C. The resulting solution of the 1:1 copper complex disazo compound is filtered and then evaporated.

200 parts of the dyestuff powder as the lithium salt, of the 1:1 copper complex disazo compound of the metal-free compound of the formula (1) are obtained. This powder contains only a small proportion of electrolyte salts and other inert salts (sodium chloride and acetate and lithium chloride and acetate). It has a very good solubility in water and possesses the same good tinctorial properties as a dyestuff product of the previous examples.

EXAMPLE 8

For the preparation of 1:1 copper disazo compound according to the process of the invention, the procedure of Example 1 is followed, however, the 2-amino-4-(beta-sulfatoethylsulfonyl)-anisole used as the diazo component in part (b) is replaced by 2-amino-4-(beta-thiosulfatoethylsulfonyl)-anisole in an equimolar amount. The 1:1-copper complex disazo compound (in the form of its sodium salt) of the metal-free compound of the formula

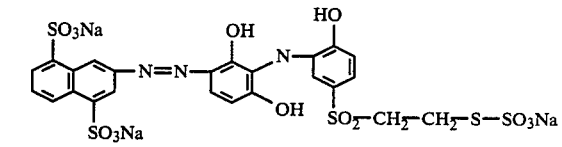

is obtained. This copper complex disazo compound also has very good tinctorial properties and yields, for example, on cotton by the usual dyeing or printing methods for fiber-reactive dyestuffs, strong reddish-brown dyeings and prints with excellent fastness to light and with good to very good fastness to wet processing are obtained.

EXAMPLE 9

For the preparation of a 1:1 copper complex disazo compound according to the process of the invention, the procedure of Example 1 is followed, however, the 2-amino-4-(beta-sulfatoethylsulfonyl)-anisole used as the diazo component in part (b) is replaced by 2-amino-4-(beta-phosphatoethylsulfonyl)-anisole in an equimolar amount. The 1:1 copper complex disazo compound (in the form of its sodium salt) of the metal free compound of the formula:

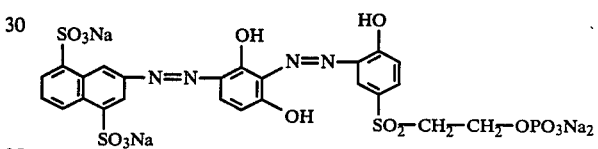

is obtained. This copper complex disazo compound also has very good tinctorial properties and yields, for example, on cotton by the usual dyeing or printing methods for fiber-reactive dyestuffs, strong reddish-brown dyeings and prints with excellent fastness to light and good to very good fastness to wet processing are obtained.

EXAMPLE 10

For the preparation of a 1:1 copper complex disazo compound according to the process of the invention, the procedure of Example 1 is followed, however, the 2amino-4vinylsulfonyl-anisole used as the diazo component in part (b) is replaced by 2-amino-4-(beta-thiosulfatoethylsulfonyl)-anisole in an equimolar amount. The 1:1-copper complex disazo compound (in the form of its sodium salt) of the metal free compound of the formula:

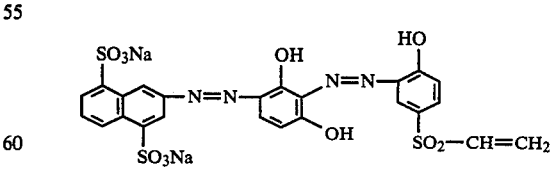

is obtained. This copper complex disazo compound also has very good tinctorial properties and yields, for example, on cotton by the usual dyeing or printing methods for fiber-reactive dyestuffs, strong reddish-brown dyeings and prints with excellent fastness to light and good to very good fastness to wet processing are obtained.

EXAMPLE 11

For the preparation of a 1:1 copper complex disazo compound according to the process of the invention, the procedure of Example 1 is followed, however, the 2-amino-4-(beta-sulfatoethylsulfonyl)-anisole used as the diazo component in part (b) is replaced by 2-amino-4-(beta-acetyloxyethylsulfonyl)-anisole in an equimolar amount. The 1:1 copper complex disazo compound (in the form of its sodium salt) of the metal-free compound of the formula:

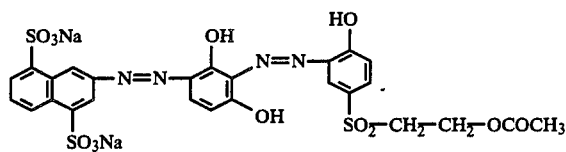

is obtained. This copper complex disazo compound also has very good tinctorial properties and yields, for example, on cotton by the usual dyeing or printing methods for fiber-reactive dyestuffs. Strong reddish-brown dyeings and prints with excellent fastness to light and good to very good fastness to wet processing are obtained.

EXAMPLE 12

For the preparation of a 1:1 copper complex disazo compound according to the process of the invention, the procedure of Example 1 is followed, however, the 2-amino-4-(beta-sulfatoethylsulfonyl)-anisole used as diazo component in part (b) is replaced by 2-amino-4-(beta-chloroethylsulfonyl)-anisole in an equimolar amount. The 1:1 copper complex disazo compound (in the form of its sodium salt) of the metal-free compound of the formula:

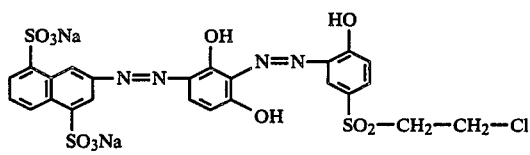

is obtained. This copper complex disazo compound also has very good tinctorial properties and yields for example, on cotton by the usual dyeing or printing methods for fiber-reactive dyestuffs. Strong reddish-brown dyeings and prints with excellent fastness to light and good to very good fastness to wet processing are obtained with the same good properties as those that were made with the corresponding copper-complex sufato-disazo compound of Example 1.

We claim:

1. A process for the preparation of a 1:1 copper complex of a disazo compound corresponding to the following formula:

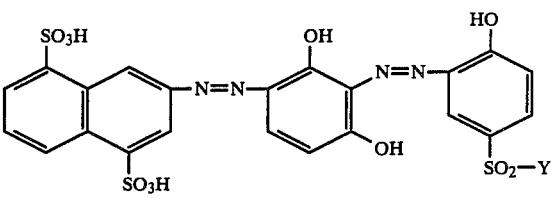

wherein:
M is selected from hydrogen, the alkali metals or the alkaline earth metals and
Y is the vinyl group or $CH_2-CH_2Z$ wherein Z is selected from thiosulfato, phosphato, chloro, acetoxy, and sulfato; which comprises reacting a disazo compound of the following formula:

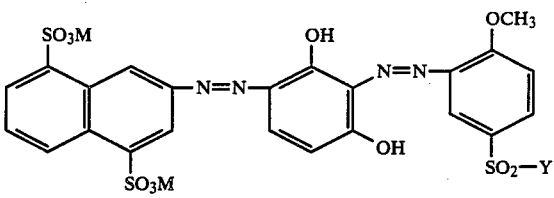

in which M and Y are as above defined with a copper donor at a temperature from about 70° to about 130° C. and at a pH from about 3 to 6.

2. A process according to claim 1 wherein the reaction is conducted at a temperature from about 80° to about 100° C.

3. A process according to claim 1 where said pH is from about 3.5 to about 5.0.

4. A process according to claim 2 wherein said pH is from 3.5 to about 5.0.

5. A process according to claim 1, 2, 3, or 4 wherein said copper donor is reacted in at least an equal molar amount with said disazo compound of the formula:

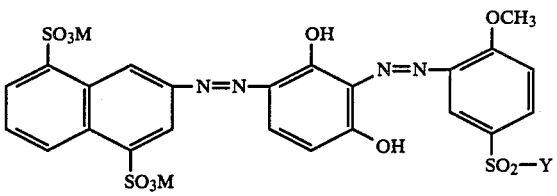

wherein:
M is selected from hydrogen, the alkali metals or the alkaline earth metals and
Y is the vinyl group or $CH_2-CH_2Z$ wherein Z is selected from thiosulfato, phosphato, chloro, acetoxy, and sulfato.

* * * * *

UNITED STATES PATENT AND TRADEMARK OFFICE
CERTIFICATE OF CORRECTION

PATENT NO.   :  4,760,134
DATED        :  July 26, 1988
INVENTOR(S)  :  A. J. Corso, F. Meininger & H.H. Steuernagel It is certified that error appears in the above-identified patent and that said Letters Patent is hereby corrected as shown below:

Title Page:       "DIMETHYLATION"  should read DEMETHYLATION

Column 1, Line 6:    "DIMETHYLATION" should read DEMETHYLATION

Column 1, Line 49:   Close parentheses after . . . sulfonyl)

Column 1, Line 54:   "monazo" should read monoazo

Column 2, Line 60:   "temperture" should read temperature

Column 3, Line 34:   "comparision" should read comparison

Column 4, Line 49:   "comparision" should read comparison

Column 5, Line 10:   should read . . . above 100° C, it is in

Column 5, Line 58:   "or" should read of

Column 6, Line 11:   delete "l" before invention

Column 7, Line 61:   "comlex" should read complex

Signed and Sealed this

Thirty-first Day of January, 1989

*Attest:*

DONALD J. QUIGG

*Attesting Officer*      *Commissioner of Patents and Trademarks*